United States Patent
Ko et al.

(10) Patent No.: US 9,469,334 B2
(45) Date of Patent: Oct. 18, 2016

(54) REDUCER AND ELECTRIC POWER STEERING APPARATUS HAVING THE SAME

(71) Applicant: MANDO CORPORATION, Pyeongtaek-si, Gyeonggi-do (KR)

(72) Inventors: Kyung Min Ko, Seongnam-si (KR); Jung Sik Park, Seongnam-si (KR); Seong Ho Choi, Anyang-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 108 days.

(21) Appl. No.: 14/247,646

(22) Filed: Apr. 8, 2014

(65) Prior Publication Data

US 2014/0305731 A1    Oct. 16, 2014

(30) Foreign Application Priority Data

Apr. 15, 2013    (KR) .................. 10-2013-0040763

(51) Int. Cl.
  *B62D 5/04*    (2006.01)
  *F16H 1/32*    (2006.01)

(52) U.S. Cl.
  CPC ........... *B62D 5/0403* (2013.01); *B62D 5/0415* (2013.01); *F16H 1/32* (2013.01); *F16H 1/321* (2013.01); *F16H 2001/324* (2013.01)

(58) Field of Classification Search
  CPC .... B62D 5/04; B62D 5/0403; B62D 5/0409; B62D 5/0415; B62D 5/008; F16H 1/321; F16H 1/32; F16H 2001/324
  USPC .......................... 180/443, 444, 446; 475/176
  See application file for complete search history.

(56) References Cited

U.S. PATENT DOCUMENTS

| | | | | |
|---|---|---|---|---|
| 3,558,944 A * | 1/1971 | Verge | ..................... | H02K 41/06 310/82 |
| 4,807,494 A * | 2/1989 | Lew | .......................... | F16H 1/32 475/166 |
| 6,029,768 A * | 2/2000 | Kiyosawa | ............ | B62D 5/0415 180/444 |
| 7,614,974 B2 * | 11/2009 | Strobel | .................. | B62D 5/008 475/168 |
| 7,878,294 B2 * | 2/2011 | Morikawa | .............. | B62D 5/008 180/204 |
| 7,926,613 B2 * | 4/2011 | Matsuda | ................ | B62D 5/008 180/443 |
| 2002/0025875 A1 * | 2/2002 | Tsujioka | ................... | F16H 1/32 475/162 |
| 2009/0208636 A1 * | 8/2009 | Choi | ..................... | C23C 16/305 427/76 |

* cited by examiner

*Primary Examiner* — Anne Marie Boehler
(74) *Attorney, Agent, or Firm* — Hauptman Ham, LLP (57) ABSTRACT

Disclosed are a reducer and an electric power steering apparatus having the same. According to the present invention, an input shaft, a driving shaft, and a pinion shaft are coaxially arranged. Thus, a conventional configuration, in which a motor inevitably protrudes, can be improved to prevent the motor from interfering with the other structures. Therefore, a layout configuration in an apparatus can be compactly formed.

19 Claims, 7 Drawing Sheets

REDUCER AND ELECTRIC POWER STEERING APPARATUS HAVING THE SAME

CROSS-REFERENCE TO RELATED APPLICATION

This application claims priority from and the benefit under 35 U.S.C. §119(a) of Korean Patent Application No. 10-2013-0040763, filed on Apr. 15, 2013, which is hereby incorporated by reference for all purposes as if fully set forth herein.

BACKGROUND OF THE INVENTION

1. Field of the Invention

The present invention relates to a reducer and an electric power steering apparatus having the same, and more particularly to a reducer which improves a conventional configuration, in which a motor inevitably protrudes since a motor shaft, an input shaft, a driving shaft, a pinion shaft, etc. are coaxially arranged, to be capable of preventing the motor from interfering with other structures such that a layout configuration in an apparatus can be compactly formed, and an electric power steering apparatus having the reducer.

2. Description of the Prior Art

Figure 1:
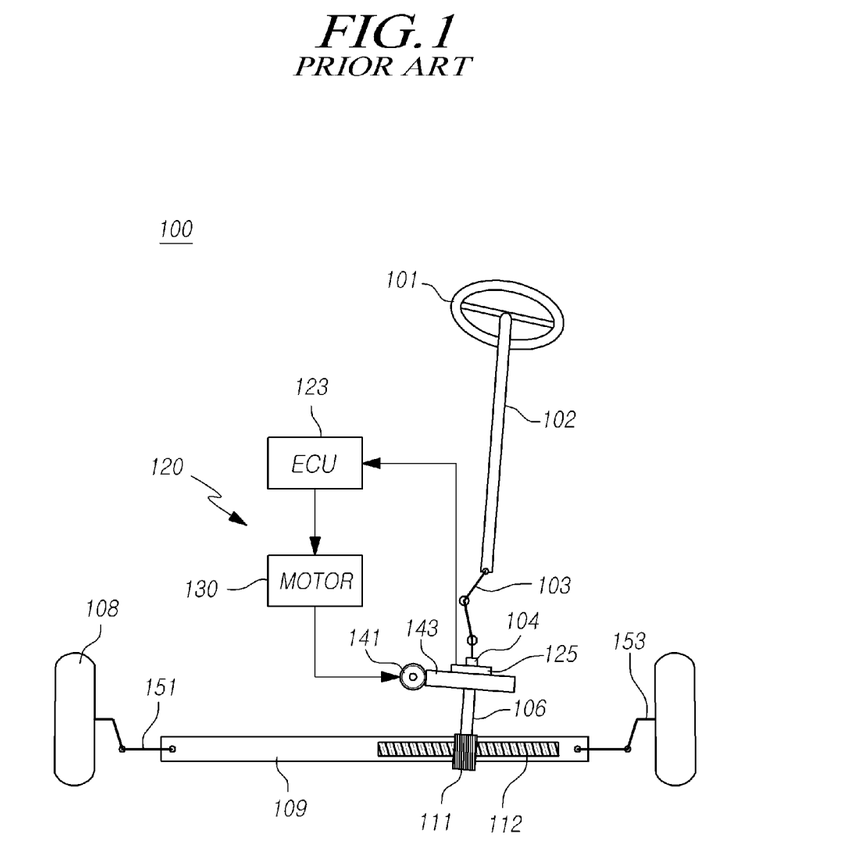
FIG. 1 is a view illustrating a configuration of a conventional electric power steering apparatus for a vehicle.

FIG. 1 is a view illustrating a configuration of a conventional electric power steering apparatus for a vehicle.

As illustrated in FIG. 1, a conventional electric power steering apparatus 100 for a vehicle includes a steering system leading from a steering wheel 101 to opposite vehicle wheels 108 and an auxiliary power mechanism 120 configured to supply a steering assistance force to the steering system.

The steering system includes a steering shaft 102 of which one end is connected to the steering wheel 101 and the other end is connected to a driving shaft via a universal joint 103.

The driving shaft includes an input shaft 104 connected with the steering shaft 102 and a pinion shaft 106 connected with the input shaft 104 via a torsion bar (not illustrated) and formed with a pinion gear 111 at a lower end thereof.

The pinion gear 111 formed on the pinion shaft 106 is teeth-engaged with a rack gear 112 formed at one end of the outer circumferential surface of a rack bar 109, and the opposite ends of the rack bar 109 are connected to the vehicle wheels 108 through tie rods 151 and knuckle arms 153.

The auxiliary power mechanism 120 includes a torque sensor 125 configured to sense a torque generated in the input shaft 104 when a driver operates the steering wheel 101 and output an electric signal which is proportional to the sensed torque, an Electronic Control Unit (ECU) 123 configured to generate a control signal based on the electric signal transmitted from the torque sensor 125, a motor 130 configured to generate an auxiliary power based on the control signal transmitted from the electronic control unit 123, and a worm 141 and worm wheel 143 configured to transmit the auxiliary power generated by the motor 130 to the pinion shaft 106.

In the conventional electric power steering apparatus for a vehicle, the motor, the worm, the worm wheel, etc. are used as components for the reducer of the auxiliary power mechanism. Thus, when the components are equipped in a vehicle, the motor inevitably protrudes to interfere with other structures, which is disadvantageous in terms of the layout.

SUMMARY OF THE INVENTION

Accordingly, the present invention has been made to solve the above-mentioned problems occurring in the prior art, and an object of the present invention is to provide a reducer which improves a conventional configuration, in which a motor inevitably protrudes since a motor shaft, an input shaft, a driving shaft, a pinion shaft, etc. are coaxially arranged, to be capable of preventing the motor from interfering with other structures such that the layout configuration in an apparatus can be compactly formed, and an electric power steering apparatus having the reducer.

In addition, another object of the present invention is to provide a reducer in which the number of teeth of a step gear, a fixed ring gear, a movable ring gear or the like can be adjusted such that a rotational force generated by a motor and transmitted to a pinion shaft can be easily adjusted, and an electric power steering apparatus having the reducer.

The objects of the present invention are not limited to the foregoing and other objects may be easily understood by a person ordinarily skilled in the art from the following descriptions.

According to an exemplary embodiment of the present invention, there is provided a reducer including: an eccentric cam formed with a coupling hole in which one end of a hollow motor shaft of a motor is fitted; a step gear including a large-diameter portion formed with first gear teeth on an outer circumferential surface thereof, the eccentric cam is fitted in the large-diameter portion, and a small-diameter portion extending axially from the large-diameter portion and formed with second gear teeth on an outer circumferential surface thereof, the step gear having a central axis spaced apart from a central axis of the motor shaft by a predetermined distance; a fixed ring gear fixedly supported on a lower inner circumferential surface of a housing of the motor, the fixed ring gear being formed with third gear teeth around an inner circumferential surface thereof to be tooth-engaged with the first gear teeth of the large-diameter portion and being provided to be coaxial to the central axis of the motor shaft; and a movable ring gear being formed with a fourth gear teeth around an inner circumferential surface at one side thereof to be tooth-engaged with the second gear teeth of the small-diameter portion, wherein a terminal end, which extends through the eccentric cam from a driving shaft that penetrates the motor shaft and is connected with a steering wheel, is coupled to a central portion of the movable ring gear, and a pinion shaft is coupled to the movable ring gear on the other side.

According to another exemplary embodiment of the present invention, there is provided an electric power steering apparatus for a vehicle, the apparatus comprising: a motor provided with a housing and a hollow motor shaft; a driving shaft that penetrates the motor shaft and is connected with a steering wheel; and a reducer that is connected with the motor shaft, the driving shaft, and a pinion shaft inside a lower portion of the housing and transfers the driving force of the motor to the pinion shaft.

According to the present invention, since the motor shaft, the input shaft, the driving shaft, and the pinion shaft are coaxially arranged, a conventional configuration, in which a motor inevitably protrudes, can be improved to prevent the motor from interfering with the other structures. Therefore, a layout configuration in an apparatus can be compactly formed.

In addition, according to the present invention, the number of teeth of each of the step gear, the fixed ring gear, and the movable ring gear can be adjusted such that the rotational force generated by the motor and transferred to the pinion shaft can be easily adjusted.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings.

Figure 2:
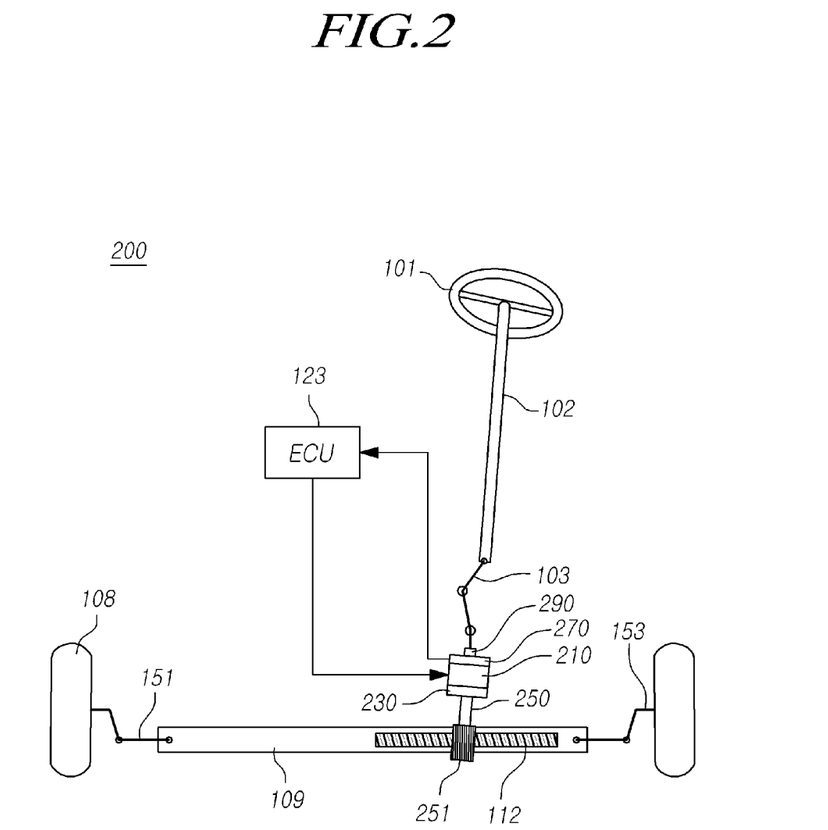
FIG. 2 is a view illustrating a configuration of an electric power steering apparatus provided with a reducer according to an exemplary embodiment of the present invention.
Figure 3:
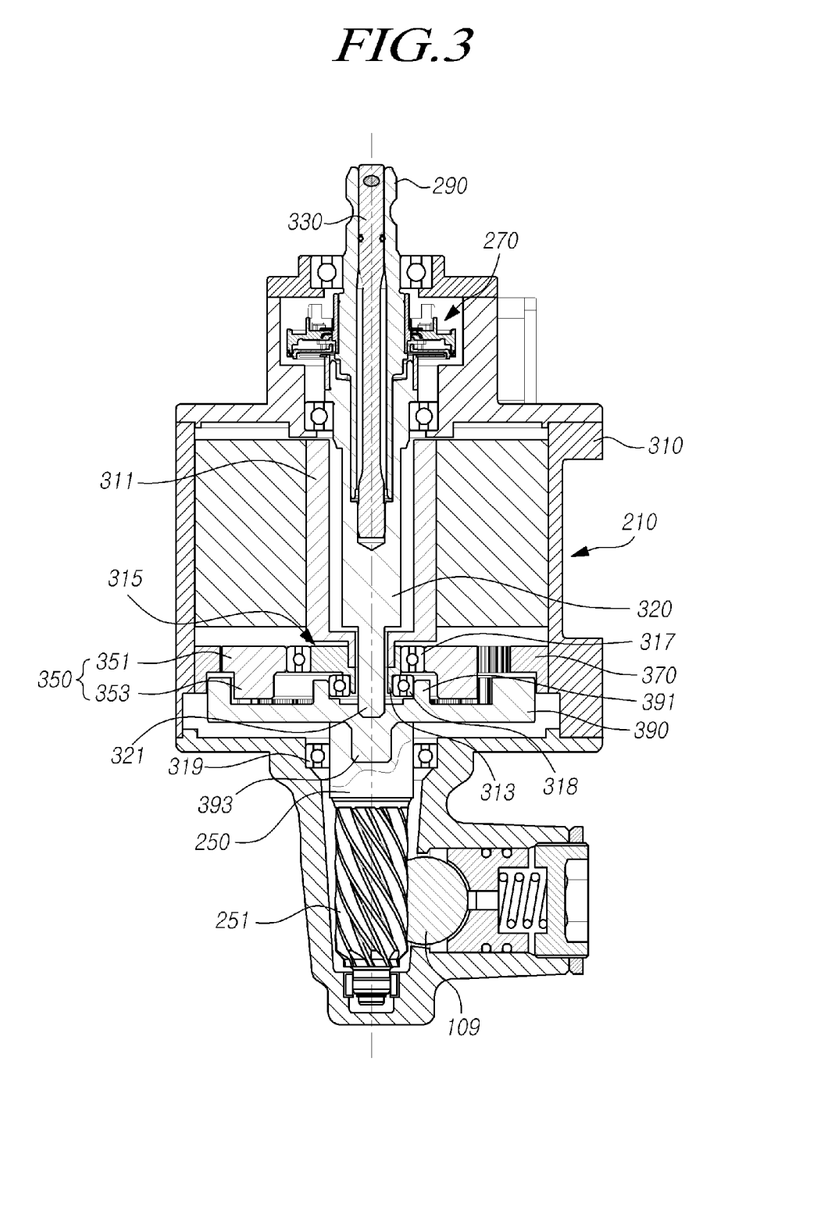
FIG. 3 is a cross-sectional view for a part of FIG. 2.
Figure 4:
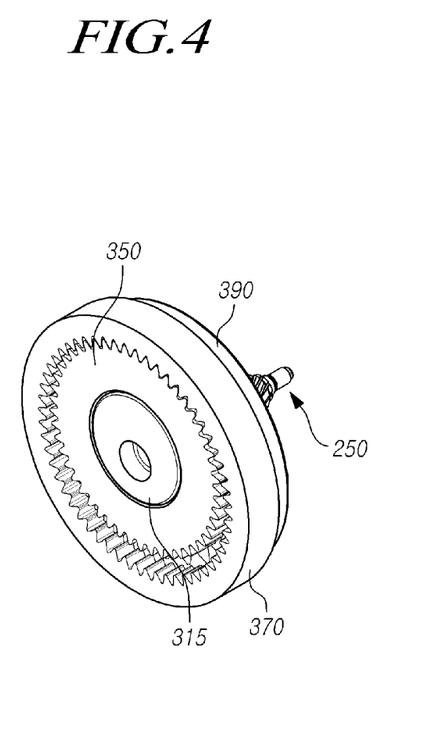
FIG. 4 is a perspective view of an example of a reducer which may be employed in the configuration illustrated in FIG. 2.
Figure 5:
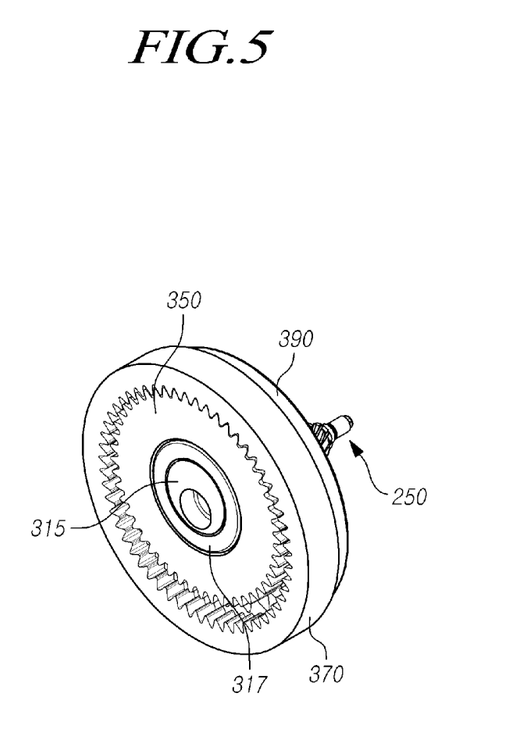
FIG. 5 is a perspective view illustrating another example of a reducer of FIG. 2 which may be employed in the configuration illustrated in FIG. 2.
Figure 6:
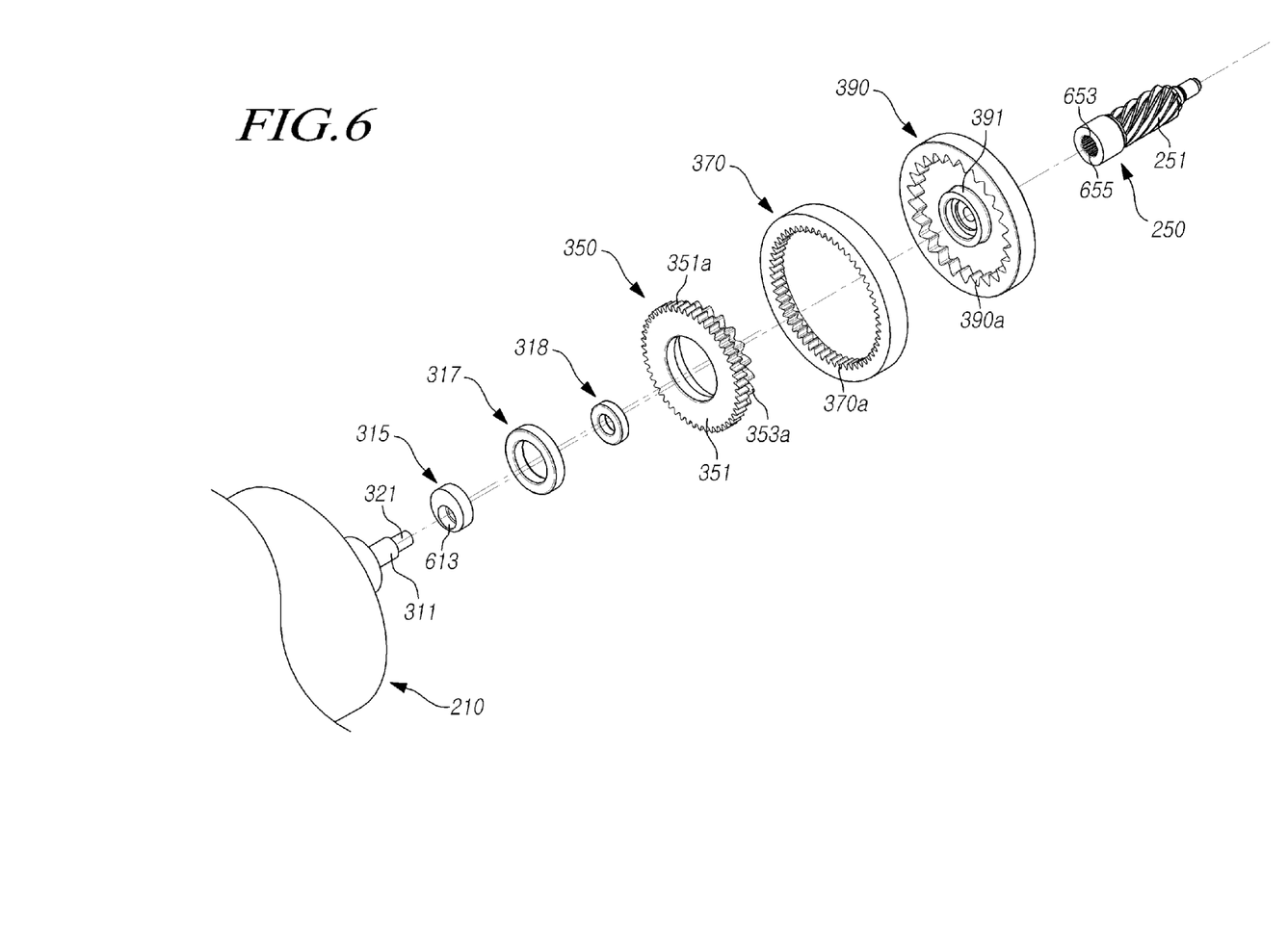
FIGS. 6 and 7 are exploded perspective views of the reducer of FIG. 5.
Figure 7:
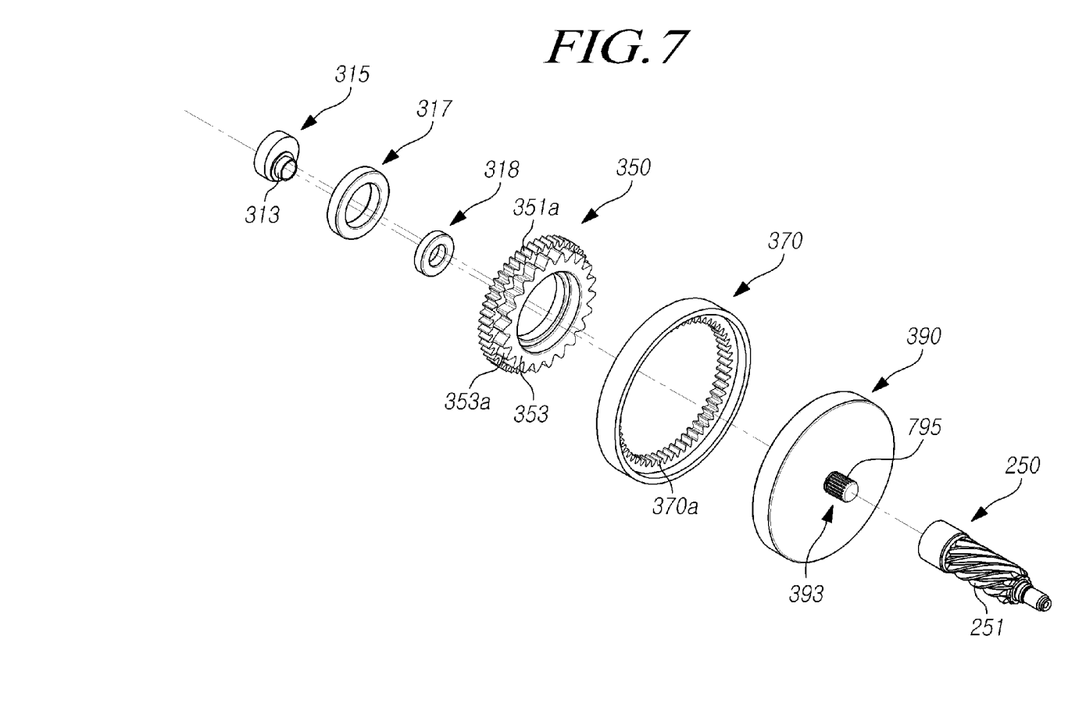

FIG. 2 is a view illustrating a configuration of an electric power steering apparatus provided with a reducer according to an exemplary embodiment of the present invention. FIG. 3 is a cross-sectional view for a part of FIG. 2. FIG. 4 is a perspective view of an example of a reducer which may be employed in the configuration illustrated in FIG. 2. FIG. 5 is a perspective view illustrating another example of a reducer of FIG. 2 which may be employed in the configuration illustrated in FIG. 2. FIGS. 6 and 7 are exploded perspective views of the reducer of FIG. 5.

As illustrated in the drawings, a reducer 230 according to an exemplary embodiment of the present invention includes: an eccentric cam 315 formed with a coupling hole 613 in which one end of a hollow motor shaft 311 of a motor 210 is fitted; a step gear 350 including a large-diameter portion 351 formed with first gear teeth 351a on outer circumferential surface thereof, the eccentric cam 315 is fitted in the large-diameter portion 351 and having, and a small-diameter portion 353 extending axially from the large-diameter portion 351 and formed with second gear teeth 353a on an outer circumferential surface thereof, the step gear 350 having a central axis spaced apart from a central axis of the motor shaft 311 by a predetermined distance; a fixed ring gear 370 fixedly supported on a lower inner circumferential surface of a housing 310 of the motor 210, the fixed ring gear 370 being formed with third gear teeth 370a around an inner circumferential surface thereof to be tooth-engaged with the first gear teeth 351a of the large-diameter portion 351 and being provided to be coaxial to the central axis of the motor shaft 311; and a movable ring gear 390 being formed with fourth gear teeth 390a around an inner circumferential surface at one side thereof to be tooth-engaged with the second gear teeth 353a of the small-diameter portion 353, wherein a terminal end 321, which extends through the eccentric cam 315 from the driving shaft 320 that penetrates the motor shaft 311 and is connected with a steering wheel 101, is coupled to a central portion of the movable ring gear 390, and a pinion shaft 250 is coupled to the movable ring gear 390 on the other side.

The eccentric cam 315 is fitted on the one end of the motor shaft 311. For this purpose, the eccentric cam 315 is formed with a coupling hole 613 such that the one end of the motor shaft 311 can be fitted in the coupling hole 613. For example, the one end of the motor shaft 311 can be press-fitted in the coupling hole 613 of the eccentric cam 315.

In addition, on a side of the eccentric cam 315 opposite to the motor 210, a protrusion 313 is formed which is hollow to communicate with the coupling hole 613 and protrudes and extends in an axial direction.

Meanwhile, the eccentric cam 315 is fitted in the large-diameter portion 351 of the step gear 350 and will be described later. The first bearing 317 may be coupled to the outer circumference side of the eccentric cam 315 so as to reduce friction when the eccentric cam 315 is rotated and then the eccentric cam 315 may be coupled with the large-diameter portion 351 of the step gear 350. A second bearing 318 may be coupled to an outer circumference side of the protrusion 313 of the eccentric cam 315 and then the protrusion 313 may be coupled to a coupling portion 391 formed in the central portion of the movable ring gear 390 to be described later.

As described above, when the protrusion 313 of the eccentric cam 315 is coupled to the movable ring gear 390 via the second bearing 318, the rotational force of the eccentric cam 315 is not transferred to the movable ring gear 390 even if the movable ring gear 390 is coupled to and supported by the eccentric cam 315.

The step gear 350 includes the large-diameter portion 351 in which the eccentric cam 315 is fitted and the small-diameter portion 353 extending in the axial direction from the large-diameter portion 351. The large-diameter portion 351 includes the first gear teeth 351a formed on the outer circumferential surface thereof, and the small-diameter portion 353 includes the second gear teeth 353a formed on the outer circumferential surface thereof. The step gear has the central axis spaced apart from the central axis of the motor shaft 311 by a predetermined distance.

When the central axis of the step gear 350 and the central axis of the motor shaft 311 are formed to be spaced apart from each other by the predetermined distance as described above, the step gear 350 turns on its axis and revolves around the central axis of the motor shaft 311 when the eccentric cam 315 is rotated.

The fixed ring gear 370 is supported by and fixed to the lower inner circumferential surface of the housing 310 of the motor 210. The third gear teeth 370a are formed around the inner circumferential surface of the fixed ring gear 370 to be tooth-engaged with the first gear teeth 351a formed on the outer circumferential surface of the large-diameter portion 351 of the step gear 350 and the central axis of the fixed ring gear 370 is coaxial to the central axis of the motor shaft 311.

Accordingly, the step gear 350 is tooth-engaged with the third gear teeth 370a of the fixed ring gear 370 and turns on its own axis within the fixed ring gear 370 while moving along the inner circumferential surface of the fixed ring gear 370.

The movable ring gear 390 is formed with the fourth gear teeth 390a around the inner circumferential surface on one side thereof to be tooth-engaged with the second gear teeth 353a of the small-diameter portion 353 of the step gear 350. The terminal end 321, which extends from the driving shaft 320 that is provided inside the motor shaft 311 and connected with a steering wheel 101, is coupled to the center of the movable ring gear 390 through the eccentric cam 315, and the pinion shaft 250 is coupled to the movable ring gear 390 on the other side.

In addition, the movable ring gear 390 is provided to be coaxial to the central axis of the motor shaft 311.

Meanwhile, at the center of the one side of the movable ring gear 390, a coupling portion 391 is formed into which the protrusion 313 of the eccentric cam 315 is inserted to be supported. The second bearing 318 is coupled between the protrusion 313 of the eccentric cam 315 and the coupling portion 391 as described above such that the rotational force of the eccentric cam 315 is not transferred to the movable ring gear 390 but the rotational force of the step gear 350 is transferred to the movable ring gear 390.

In addition, on the other side of the movable ring gear 390, a protruding coupling portion 393 is provided and first serrations 795 are formed on an outer circumferential surface of the protruding coupling portion 393. The protruding coupling portion 393 is fitted in a coupling groove formed on the pinion shaft 250. For this purpose, second serrations 655 are formed on an inner circumferential surface of the coupling groove 653 of the pinion shaft 250 to correspond to the first serrations 795.

When the protruding coupling portion 393 of the movable ring gear 390 and the pinion shaft 250 are serration-engaged with each other as described above, the rotational force of the movable ring gear 390 is transferred to the pinion shaft 250 without being lost.

Meanwhile, the above-described reducer 230 according to the exemplary embodiment may be installed in an electric power steering apparatus of a vehicle. Referring to the drawings, an electric power steering apparatus 200 according to another exemplary embodiment of the present invention includes: a motor 210 provided with a housing 310 and a hollow motor shaft 311; a driving shaft 320 that penetrates the motor shaft 311 and is connected with a steering wheel 101; and a reducer that is connected with the motor shaft 311, the driving shaft 320, and a pinion shaft 250 inside a lower portion of the housing 310 and transfers the driving force of the motor 210 to the pinion shaft 250. An example of the reducer is as described above.

Meanwhile, the input shaft 290 is connected with the universal joint 103 through the steering shaft 102 and the steering shaft 102 is connected with the steering wheel 101. Thus, as the steering wheel 101 is rotated, the steering shaft 102 and the input shaft 290 are rotated in unison.

The motor 210 is provided in a state that includes the housing 310 and the hollow motor shaft 311.

The motor 210 generates an auxiliary power based on a control signal transferred from the Electronic Control Unit (ECU) 123. The auxiliary power rotates the eccentric cam 315 through the motor shaft 311 so as to rotate the step gear 350 and the movable ring gear 390.

The driving shaft 320 penetrates the motor shaft 311 and is connected with the steering wheel 101. More specifically, the driving shaft 320 may be connected to the input shaft 290 connected with the steering wheel 101 through a torsion bar 330, for example.

In addition, the terminal end 321 of the driving shaft 320 extends to the outside of the motor shaft 311 and penetrates the eccentric cam 315 of the reducer 230 to be coupled with the movable ring gear 390 such that the rotational force applied by a driver to the steering wheel 101 is transferred to the pinion shaft 250 through the movable ring gear 390.

In addition, at an upper portion of the motor 210 (i.e., the side opposite to the reducer 230 with reference to the motor 210), a torque sensor 270 may be provided which is coupled to the input shaft 290 and the driving shaft 320 to measure a torque value applied to the input shaft 290 as the steering wheel 101 is operated. The torque value of the input shaft 290 measured by the torque sensor 270 is converted into an electric signal and the electric signal is sent to the ECU 123 so as to control the motor 210.

That is, the torque sensor 270 measures a relative displacement angle of the rotor coupled to the input shaft 290 and a rotor coupled to the driving shaft 320, converts the angle into an electric signal, and transmits the electric signal to the ECU 123.

The pinion shaft 250 is coupled to the movable ring gear 390 of the reducer 230 at the side opposite to the coupling portion 391 and the pinion gear 251 tooth-engaged with the rack gear 112 formed on the rack bar 109 is formed on the outer circumferential surface of the pinion shaft 250.

In addition, the third bearing 319 supported by the inner circumferential surface of the housing 310 is coupled to the upper portion of the pinion gear 251 in the pinion shaft 250.

Referring to the drawings, an operating example of the electric power steering apparatus for a vehicle which is provided with the reducer according to the exemplary embodiment of the present invention will be described.

When a driver rotates the steering wheel 101, the input shaft 290 connected with the steering shaft 102 and the steering shaft 102 through the universal joint 103 is rotated, then the driving shaft 320 connected with the input shaft 290 through the torsion bar 330 is rotated and the movable ring gear 390 coupled with the driving shaft 320 is rotated, and then the pinion shaft 250 coupled with the movable ring gear 390 is rotated. Thus, the rotational force of the steering wheel 101 is transferred as a driving force for a leftward-rightward rectilinear motion of the rack bar 109.

Further, the torque value of the input shaft 290 is measured by the torque sensor 270, and the measured torque value is converted into an electric signal which is sent to the ECU 123.

Meanwhile, the electronic control unit 123 controls the motor 210 to generate an auxiliary power based on the electric signal transmitted from the torque sensor 270 and electric signals transmitted from other various sensors, and the generated auxiliary power rotates the motor shaft 311 and consequently, rotates the eccentric cam 315 and the step gear 350.

In addition, the step gear 350 moves along the inner circumferential surface of the fixed ring gear 370 while turning on its own axis, and at the same time, rotates the movable ring gear 390 so as to transfer the auxiliary power of the motor 210 to the pinion shaft 250 coupled with the movable ring gear 390.

Meanwhile, descriptions have been made above with reference to an example, in which the torque sensor 270 is provided in the upper portion of the housing 310 of the motor 210. However, unlike this, the torque sensor may be provided on the steering shaft 102.

Of course, when the torque sensor is provided on the steering shaft 102, the above-described connection structure of the driving shaft, the input shaft and the torsion bar is provided on the steering shaft 102.

As described above, according to the present invention, since the motor shaft, the input shaft, the driving shaft, and the pinion shaft are coaxially arranged, a conventional configuration, in which a motor inevitably protrudes, can be improved to prevent the motor from interfering with the other structures. Therefore, a layout configuration in an apparatus can be compactly formed.

In addition, according to the present invention, the number of teeth of each of the step gear, the fixed ring gear, and the movable ring gear can be adjusted such that the rotational force generated by the motor and transferred to the pinion shaft can be easily adjusted.

What is claimed is:

1. A reducer comprising:
   an eccentric cam formed with a coupling hole in which one end of a hollow motor shaft of a motor is fitted;
   a step gear including a large-diameter portion formed with first gear teeth on an outer circumferential surface of the step gear, the eccentric cam being fitted in the large-diameter portion, and a small-diameter portion extending axially from the large-diameter portion and formed with second gear teeth on an outer circumferential surface of the small-diameter portion, the step gear having a central axis spaced apart from a central axis of the motor shaft by a predetermined distance;
   a fixed ring gear fixedly supported on a lower inner circumferential surface of a housing of the motor, the fixed ring gear being formed with third gear teeth around an inner circumferential surface of the fixed ring gear to be tooth-engaged with the first gear teeth of the large-diameter portion and being provided to be coaxial to the central axis of the motor shaft; and
   a movable ring gear being formed with fourth gear teeth around an inner circumferential surface at one side of the movable ring gear to be tooth-engaged with the second gear teeth of the small-diameter portion, wherein a terminal end of a driving shaft, which extends through the eccentric cam from the driving shaft that penetrates the motor shaft and is connected with a steering wheel, is coupled to a central portion of the movable ring gear, and a pinion shaft is coupled to the movable ring gear on an opposite side of the movable ring gear.

2. The reducer of claim 1, wherein a first bearing is coupled to an outer circumference side of the eccentric cam so as to reduce friction when the eccentric cam is rotated.

3. The reducer of claim 1, wherein on a side of the eccentric cam opposite to the motor, a protrusion is formed which is hollow to communicate with the coupling hole and protrudes and extends in an axial direction, and
   wherein at a center of the movable ring gear, a coupling portion is formed and the protrusion is inserted into and supported by the coupling portion.

4. The reducer of claim 2, wherein on a side of the eccentric cam opposite to the motor, a protrusion is formed which is hollow to communicate with the coupling hole and protrudes and extends in an axial direction, and
   wherein at a center of the movable ring gear, a coupling portion is formed and the protrusion is inserted into and supported by the coupling portion.

5. The reducer of claim 4, wherein a second bearing is coupled to an outer circumference side of the protrusion.

6. The reducer of claim 1, wherein a protruding coupling portion is provided on the other side of the movable ring gear and first serrations are formed on an outer circumferential surface of the protruding coupling portion, and
   wherein a coupling groove is provided such that the protruding coupling portion is inserted into and coupled to the coupling groove, and second serrations are formed on an inner circumferential surface of the coupling groove of the pinion shaft.

7. The reducer of claim 2, wherein a protruding coupling portion is provided on the other side of the movable ring gear and first serrations are formed on an outer circumferential surface of the protruding coupling portion, and
   wherein a coupling groove is provided such that the protruding coupling portion is inserted into and coupled to the coupling groove, and second serrations are formed on an inner circumferential surface of the coupling groove of the pinion shaft.

8. The reducer of claim 3, wherein a protruding coupling portion is provided on the other side of the movable ring gear and first serrations are formed on an outer circumferential surface of the protruding coupling portion, and
   wherein a coupling groove is provided such that the protruding coupling portion is inserted into and coupled to the coupling groove, and second serrations are formed on an inner circumferential surface of the coupling groove of the pinion shaft.

9. The reducer of claim 4, wherein a protruding coupling portion is provided on the other side of the movable ring gear and first serrations are formed on an outer circumferential surface of the protruding coupling portion, and
   wherein a coupling groove is provided such that the protruding coupling portion is inserted into and coupled to the coupling groove, and second serrations are formed on an inner circumferential surface of the coupling groove of the pinion shaft.

10. The reducer of claim 5, wherein a protruding coupling portion is provided on the other side of the movable ring gear and first serrations are formed on an outer circumferential surface of the protruding coupling portion, and
    wherein a coupling groove is provided such that the protruding coupling portion is inserted into and coupled to the coupling groove, and second serrations are formed on an inner circumferential surface of the coupling groove of the pinion shaft.

11. An electric power steering apparatus for a vehicle, the apparatus comprising:
    a motor provided with a housing and a hollow motor shaft;
    a driving shaft that penetrates the motor shaft and is connected with a steering wheel; and
    a reducer that is connected with the motor shaft, the driving shaft, and a pinion shaft inside a lower portion of the housing and transfers the driving force of the motor to the pinion shaft,
    wherein the reducer comprises:
      an eccentric cam formed with a coupling hole in which one end of the hollow motor shaft of the motor is fitted;
      a step gear including a large-diameter portion formed with first gear teeth on an outer circumferential surface of the step gear, the eccentric cam being fitted in the large-diameter portion, and a small-diameter portion extending axially from the large-diameter portion and formed with second gear teeth formed on an outer circumferential surface of the small-diameter portion, the step gear having a central axis spaced apart from a central axis of the motor shaft by a predetermined distance;
      a fixed ring gear fixedly supported on a lower inner circumferential surface of a housing of the motor, the fixed ring gear being formed with third gear teeth around an inner circumferential surface of the fixed ring gear to be tooth-engaged with the first gear teeth of the large-diameter portion and being provided to be coaxial to the central axis of the motor shaft; and
      a movable ring gear being formed with fourth gear teeth around an inner circumferential surface on one side of the movable ring gear to be tooth-engaged with the second gear teeth of the small-diameter portion, wherein a terminal end, which extends through the eccentric cam from the driving shaft that penetrates the motor shaft and is connected with a steering wheel, is coupled to a central portion of the movable ring gear, and a pinion shaft is coupled to the movable ring gear on the other side.

12. The apparatus of claim 11, wherein a first bearing is coupled to an outer circumference side of the eccentric cam so as to reduce friction when the eccentric cam is rotated.

13. The apparatus of claim 11, wherein, on a side of the eccentric cam opposite to the motor, a protrusion is formed which is hollow to communicate with the coupling hole and protrudes and extends in an axial direction, and wherein at a center of the movable ring gear, a coupling portion is formed and the protrusion is inserted into and supported by the coupling portion.

14. The apparatus of claim 12, wherein on a side of the eccentric cam opposite to the motor, a protrusion is formed which is hollow to communicate with the coupling hole and protrudes and extends in an axial direction, and wherein at a center of the movable ring gear, a coupling portion is formed and the protrusion is inserted into and supported by the coupling portion.

15. The apparatus of claim 14, wherein a second bearing is coupled to an outer circumference side of the protrusion.

16. The apparatus of claim 11, wherein a protruding coupling portion is provided on the other side of the movable ring gear and first serrations are formed on an outer circumferential surface of the protruding coupling portion, and wherein a coupling groove is provided such that the protruding coupling portion is inserted into and coupled to the coupling groove, and second serrations are formed on an inner circumferential surface of the coupling groove of the pinion shaft.

17. The apparatus of claim 12, wherein a protruding coupling portion is provided on the other side of the movable ring gear and first serrations are formed on an outer circumferential surface of the protruding coupling portion, and wherein a coupling groove is provided such that the protruding coupling portion is inserted into and coupled to the coupling groove, and second serrations are formed on an inner circumferential surface of the coupling groove of the pinion shaft.

18. The apparatus of claim 13, wherein a protruding coupling portion is provided on the other side of the movable ring gear and first serrations are formed on an outer circumferential surface of the protruding coupling portion, and wherein a coupling groove is provided such that the protruding coupling portion is inserted into and coupled to the coupling groove, and second serrations are formed on an inner circumferential surface of the coupling groove of the pinion shaft.

19. The apparatus of claim 11, wherein the driving shaft is connected to the input shaft connected with the steering wheel through a torsion bar, and wherein a torque sensor coupled to the input shaft and the driving shaft is provided to measure a torque value applied to the input shaft as the steering wheel is operated.

* * * * *